Oct. 2, 1928.
C. W. DRAKE
1,685,944
SYNCHRONOUS MOTOR STARTER
Filed June 17, 1920
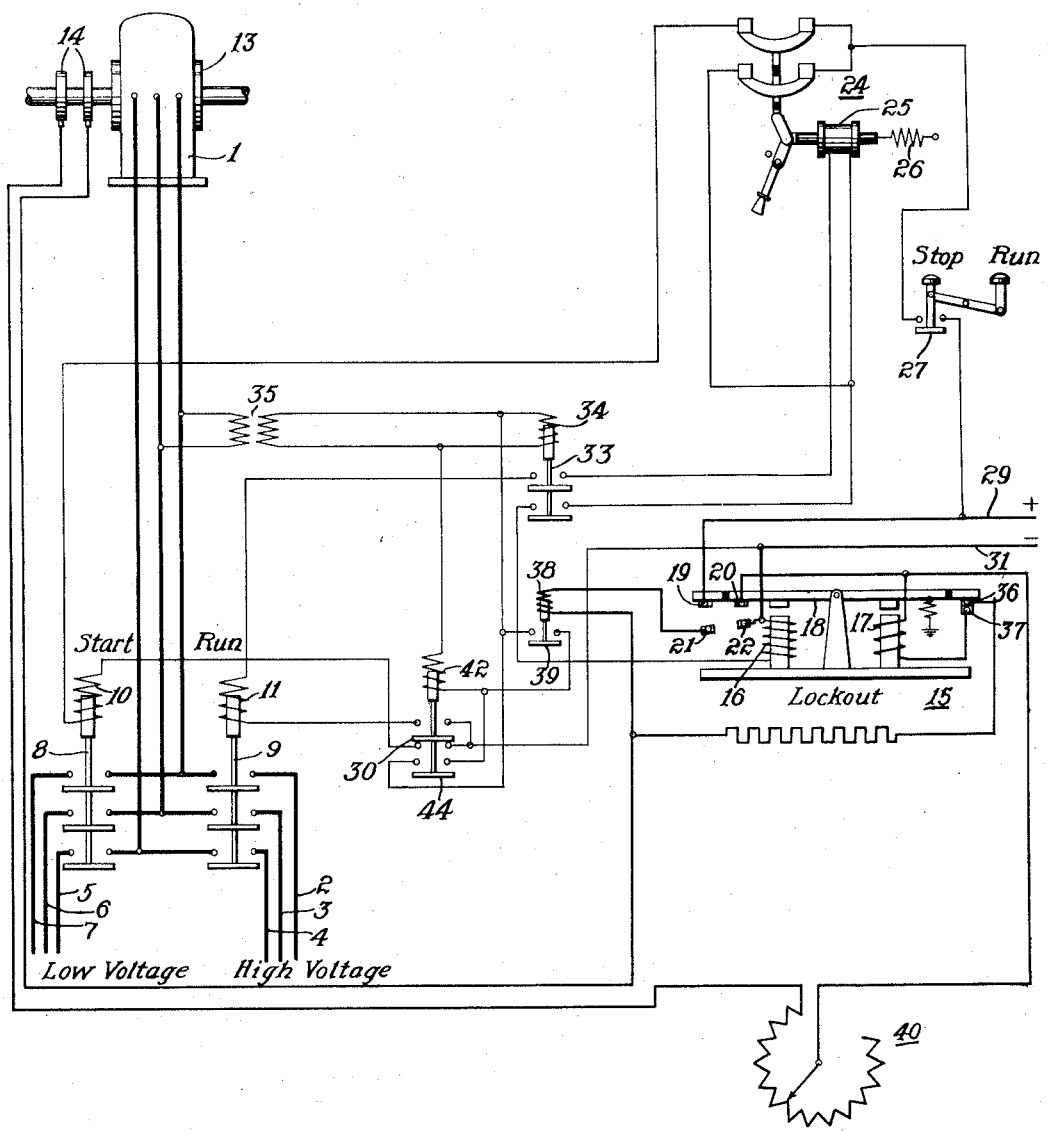
WITNESSES:
H. J. Shelhamer
J. R. Langley.
INVENTOR
Chester W. Drake
BY
Wesley S. Carr
ATTORNEY Patented Oct. 2, 1928.

1,685,944

UNITED STATES PATENT OFFICE.

CHESTER W. DRAKE, OF IRWIN, PENNSYLVANIA, ASSIGNOR TO WESTINGHOUSE ELECTRIC & MANUFACTURING COMPANY, A CORPORATION OF PENNSYLVANIA.

SYNCHRONOUS MOTOR STARTER.

Application filed June 17, 1920. Serial No. 389,597.

My invention relates to motor starters and particularly to systems for automatically starting synchronous motors.

My invention has for its object to provide a simple and efficient arrangement for automatically effecting the acceleration of synchronous motors to synchronous speeds and for effecting the normal connections of such motors at the instants of their reaching synchronous speeds.

In starting synchronous motors, considerable difficulty has been encountered in accurately determining the instant at which a motor of this type has reached synchronous speed. The arrangements of the prior art comprise numerous devices for indicating the speeds of synchronous motors. Such arrangements include electric lamps or synchronizing dials.

In the employment of such arrangements, however, it is necessary to rely upon the judgment of the operator as to the proper instant at which the running connections are to be made. It frequently happens that the connections are established either while the motor is somewhat below, or above, synchronous speed and that the motor fails to remain in synchronism.

It has been observed, in connection with experiments to determine the various characteristics of synchronous motors, that, if the field circuit of such motor is closed, it is traversed by a substantially constant alternating current when the motor is accelerated from zero to substantially synchronous speed. The value of the current drops suddenly to substantially zero when synchronism is reached.

The value of the current is substantially constant by reason of the fact that the reactance of the field circuit is relatively high while its resistance is relatively low. The electromotive force generated in the field-magnet winding decreases as the motor approaches synchronism by reason of the decreased slip of the motor. This decrease is compensated for by the decrease in reactance because of the lower frequency of the field current. Accordingly, the decrease in electromotive force does not operate to cause a corresponding decrease in the value of the current.

According to my invention, I utilize the current traversing the field circuit of a synchronous motor during the acceleration period to control the connection of the exciter to the field-magnet winding and the connection of the source of energy to the armature of the motor. An electro-magnetic switch of the lockout type, which controls the running connections of the motor, is provided with a lockout coil that is in series with the field-magnet winding of the motor. This coil, which is energized by current of substantially constant value until the condition of synchronism is reached, retains the controlling switch in its open position until the motor has reached synchronism. The current traversing the field circuit then falls to substantially zero and the switch closes to connect the source of exciting current to the field-magnet winding and to effect the opening of the starting connections and the closing of the running connections.

The single figure of the accompanying drawing is a diagrammatic view of circuits and apparatus embodying my invention.

An alternating-current motor 1 of the synchronous type is supplied with energy by means of line conductors 2, 3 and 4 which may be connected to any suitable source of energy. Line conductors 5, 6 and 7, which are connected to any suitable source of energy of low voltage such, for example, as the taps of an auto transformer, supply energy for starting the motor. The starting and the running connections of the motor are respectively controlled by switches 8 and 9 that are provided with actuating coils 10 and 11, respectively. The field-magnet winding of the motor, which is carried by the rotor 13, is connected to any suitable source of energy by means of slip rings 14.

A lockout switch 15 comprises a closing coil 16 and a lockout coil 17 that is adapted to be connected in circuit with the field-magnet winding of the motor when the switch is in its open position. A pivotally mounted armature 18, upon which opposing forces are exerted by the respective coils 16 and 17, carries movable contact members 19 and 20 which respectively coact with contact members 21 and 22 to complete the normal field circuit of the motor and to effect the running connections of the motor.

The control circuits are controlled by a circuit interrupter 24 having a coil 25 for retaining the circuit interrupter in its closed position when the running connections are established. A spring 26 effects the opening of the circuit interrupter in case of failure of voltage or of opening of the normal motor circuit. A manually operable push-button switch 27, that is provided with push buttons respectively designated by the legends "stop" and "run" controls the automatic operation of the system.

It may be assumed that the motor 1 is at rest and that the various switches occupy their respective illustrated positions. To start the motor, the push-button switch 27 is closed and the circuit interrupter 24 is manually closed and retained in such position until the coil 25 is energized in a manner to be hereinafter described. The closure of the circuit interrupter 24 completes a circuit which extends from a conductor 29 through push-button switch 27, circuit interrupter 24, coil 10, and transfer relay 30 to conductor 31. Conductors 29 and 31 may be connected to any suitable source of direct current such, for example, as an exciter.

The switch 8 closes to complete the starting circuit of the motor, and voltage of low value is applied to the armature winding of the motor. A low-voltage relay 33, having an actuating coil 34 that is connected across two of the phase conductors of the motor connections by means of a transformer 35, closes to complete a circuit through interrupter 24 which comprises the closing coil 16 of the lockout switch 15.

A relatively high electromotive force is generated in the field circuit by reason of the relative movement between the rotating fluxes of the armature and the initially stationary field magnet winding. The circuit of the latter is closed at back contact members 36 and 37 of the switch 15, and the coil 17, which is included therein, is energized to maintain the switch 15 in its open position.

The motor operates substantially as an induction motor, the field-magnet winding constituting a secondary winding with its circuit closed and disconnected from the exciter or other source of direct current. When the motor reaches substantially synchronous speed, the current traversing the field circuit falls suddenly to substantially zero value. Accordingly, the coil 17 is deenergized and the coil 16 effects the closing of the switch 15.

The contact members 19 and 20 engage the respective contact members 21 and 22 to complete a circuit extending from conductor 29 through contact members 19 and 21, actuating coil 38 of an auxiliary relay 39, the field-magnet winding of the motor, rheostat 40 and contact members 22 and 20 to conductor 31.

The relay 39 closes to complete a circuit for the actuating coil 42 of transfer relay 30. The transfer relay 30 closes to open the circuit of actuating coil 10 and to complete the circuit of actuating coil 11 and retaining coil 25 of circuit interrupter 24. The switch 8 opens and the switch 9 closes in the order named and voltage of normal value is applied to the armature of the motor. The motor now operates under normal conditions.

The change in the value of the applied voltage incident to the change in connections induces an electromotive force which temporarily opposes that of the exciting source and which may be of such value as to cause the relay 39 to open. The transfer relay 30 does not open, however, upon the opening of relay 39 because an interlock 44 connected to the relay 30 completes a holding circuit for the coil 42. The provision of the auxiliary relay and the interlocking means for preventing the opening of the transfer relay constitutes the subject-matter of a copending application.

To stop the motor, it is only necessary to depress the push-mutton designated "Stop" to open the push-button switch 27. The coil 25 is de-energized and the spring 26 effects the opening of circuit interrupter 24. The circuit of coil 11 is de-energized and the switch 9 opens to disconnect the motor from the line. The coil 34 is de-energized and the switch 33 opens to de-energize the circuit comprising coil 16 of the switch 15. The switch 15 accordingly opens and the circuits controlled by contact members 19, 20, 21 and 22 respectively are opened. The transfer relay falls to its lower or illustrated position in readiness for the succeeding starting operation. The conductors 29 and 31 are disconnected from the field-magnet winding of the motor. The circuit of the field-magnet winding is again closed at contact members 36 and 37 in readiness for the succeeding starting operation.

It will be understood that, if the circuit interrupter 24 is of the self-locking type, the operation of the system may be controlled directly by the push-button switch 27. The arrangement described above provides a protective feature, however, in that it requires the operator to remain at the switchboard until the running connections of the motor are established. This arrangement also prevents the operator from pressing a number of push-button switches in rapid succession and thus subjecting the line to a heavy load by starting a corresponding number of motors substantially simultaneously.

It will be understood further that the circuit interrupter 24 may be omitted, if desired, and the starting of the motor controlled entirely by the push-button switch. The system is entirely automatic upon the closing of the control circuits.

By means of the arrangements described above, I am enabled to effect the automatic starting of a synchronous motor by the simple operation of closing a manually operable switch. The automatic controlling means operates accurately and in a uniform manner to effect the connection of the field-magnet winding of the motor and the connection of the motor to the line at the proper instant to maintain the motor in synchronism. The above and other advantages will be appreciated by those skilled in the electrical art.

I claim as my invention:

1. In a motor control system, the combination with an alternating-current motor having a field-magnet winding and switching mechanism for establishing main starting and running connections for said motor, of means for energizing said winding during normal operation of said motor, and automatic means for effecting the establishing of said running connections and the connection of said winding to said energizing means when the current traversing said winding during the starting operation falls below a predetermined value, said automatic means comprising a switch having a coil that is in circuit with said field-magnet winding during the starting operation only.

2. In a motor control system, the combination with an alternating-current motor having a field-magnet winding and switch mechanism for establishing main starting and running connections for said motor, of means for energizing said winding during normal operation of said motor, and automatic means for effecting the establishing of said running connections and the connection of said winding to said energizing means when the current traversing said winding during the starting operation falls below a predetermined value, said automatic means comprising a switch having a closing coil and a lockout coil that is in circuit with said field-magnet winding only when said switch is in its open position.

3. In a motor control system, the combination with an alternating-current motor having a field-magnet winding and switch mechanism for establishing main starting and running connections for said motor, of means for energizing said winding during normal operation of said motor, and automatic means for effecting the establishing of said running connections and the connection of said winding to said energizing means when the current traversing said winding during the starting operation falls below a predetermined value, said automatic means comprising a switch having a coil that is in circuit with said field-magnet winding only when said switch is in its open position.

4. In a motor control system, the combination with an alternating-current motor having a field-magnet winding and switching mechanism for establishing main starting and running connections for said motor, of means for energizing said winding during normal operation of said motor, and automatic means for effecting the establishing of said running connections and the connection of said winding to said energizing means when the current traversing said winding during the starting operation falls below a predetermined value, said automatic means comprising a switch having a coil, said switch having one position in which said coil is in circuit with said winding and having a second position in which said winding is connected to said energizing means and is disconnected from said coil.

5. The method of starting a synchronous motor which consists in applying voltage to its armature winding while the field-magnet winding is in a closed circuit, applying voltage to said field-magnet winding when the alternating current traversing its circuit is substantially zero and then applying a voltage of higher value to said armature winding.

6. In a motor control system, the combination with an electric motor and means for establishing starting and running connections therefor, of manually-operable means for controlling said connections comprising a manually-operable switch and means operable to retain said manually-operable switch in its closed position only when said running connections have been established.

7. In combination, a source of alternating current, an alternating current dynamo electric machine having an armature winding and field winding, switching means arranged to connect the armature winding of said machine to said source whereby a low voltage is impressed thereon, switching means arranged to connect the armature winding to said source whereby a high voltage is impressed thereon, means operative to effect the operation of said first mentioned means, a source of direct current, means arranged to connect said source of direct current to said field winding after the operation of said first mentioned switching means, and means arranged to effect the operation of said second mentioned switching means when the direct current through said field winding builds up to a predetermined value.

In testimony whereof I have hereunto subscribed my name this 14th day of June, 1920.

CHESTER W. DRAKE.